(12) United States Patent
Urbanczyk et al.

(10) Patent No.: US 9,458,301 B2
(45) Date of Patent: Oct. 4, 2016

(54) EXPANDABLE VINYL AROMATIC POLYMERS CONTAINING GRAPHITE PARTICLES HAVING A POLYMODAL PARTICLE SIZE DISTRIBUTION

(71) Applicant: TOTAL RESEARCH & TECHNOLOGY FELUY, Seneffe (BE)

(72) Inventors: Laetitia Urbanczyk, La Louviere (BE); Stephane Nowe, Monein (FR); Jacques Michel, Feluy (BE); Jean-Claude Deleye, Herne (BE); Nicolas Lambricht, Louvain-la-Neuve (BE); Philippe Lodefier, Wemmel (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 14/655,931

(22) PCT Filed: Dec. 19, 2013

(86) PCT No.: PCT/EP2013/077412
§ 371 (c)(1),
(2) Date: Jun. 26, 2015

(87) PCT Pub. No.: WO2014/102139
PCT Pub. Date: Jul. 3, 2014

(65) Prior Publication Data
US 2016/0215115 A1  Jul. 28, 2016

(30) Foreign Application Priority Data
Dec. 28, 2012  (EP) .................................... 12199751

(51) Int. Cl.
C08J 9/16 (2006.01)
C08J 9/18 (2006.01)
C08K 3/04 (2006.01)
C08J 9/00 (2006.01)
C08K 5/02 (2006.01)

(52) U.S. Cl.
CPC ............ *C08J 9/0066* (2013.01); *C08J 9/0061* (2013.01); *C08J 9/0095* (2013.01); *C08J 9/16* (2013.01); *C08K 3/04* (2013.01); *C08K 5/02* (2013.01); *C08J 2325/06* (2013.01); *C08J 2423/06* (2013.01)

(58) Field of Classification Search
None
See application file for complete search history.

(56) References Cited

U.S. PATENT DOCUMENTS

| 7,284,611 | B2 * | 10/2007 | Reddy | C09K 8/16 166/292 |
|---|---|---|---|---|
| 7,875,345 | B1 * | 1/2011 | Simpson | B29C 44/12 264/429 |
| 8,568,632 | B2 * | 10/2013 | Rynd | B82Y 30/00 264/211 |
| 2010/0197828 | A1 * | 8/2010 | Whaley | C08J 3/226 523/351 |
| 2011/0213045 | A1 | 9/2011 | Handl | |

FOREIGN PATENT DOCUMENTS

| DE | 19910257 A1 | 9/2000 |
|---|---|---|
| EP | 0620246 A1 | 10/1994 |
| EP | 0863175 A2 | 9/1998 |
| EP | 0915127 A2 | 5/1999 |
| EP | 0981575 B1 | 9/2000 |
| EP | 1102807 B1 | 4/2002 |
| EP | 1137701 B1 | 6/2002 |
| EP | 2358798 B1 | 2/2015 |
| JP | 2005-002268 A | 1/2005 |
| WO | 9851735 A1 | 11/1998 |
| WO | 2006108672 A2 | 10/2006 |
| WO | 2007045454 A9 | 7/2007 |
| WO | 2010128369 A1 | 11/2010 |
| WO | 2011042800 A1 | 4/2011 |
| WO | 2011073141 A1 | 6/2011 |
| WO | 2011133034 A1 | 10/2011 |
| WO | 2011133035 A1 | 10/2011 |
| WO | 2012175345 A1 | 12/2012 |

OTHER PUBLICATIONS

International Search Report issued in International Application No. PCT/EP2013/077412, dated Mar. 13, 2015 (4 pages).
E. Fitzer, K.-H. Kochling, H. P. Boehm and H. Marsh, "International Union of Pure and Applied Chemistry—Recommended Terminology for the Description of Carbon as a Solid", Pure Appl. Chem., 1995, vol. 67, No. 3, pp. 473-506.

* cited by examiner

*Primary Examiner* — Kara Boyle
(74) *Attorney, Agent, or Firm* — Albert Shung (57) ABSTRACT

Expandable vinyl aromatic polymers may contain comminuted graphite with a polymodal particle size distribution. Foams obtained from such expandable vinyl aromatic polymers have a reduced thermal conductivity at a reduced foam density.

19 Claims, 3 Drawing Sheets

EXPANDABLE VINYL AROMATIC POLYMERS CONTAINING GRAPHITE PARTICLES HAVING A POLYMODAL PARTICLE SIZE DISTRIBUTION

CROSS-REFERENCE TO RELATED APPLICATIONS

This application is National Stage Entry of PCT/EP2013/077412, filed on Dec. 19, 2013, which claims priority from EP 12199751.4, filed on Dec. 28, 2012, the entireties of which are incorporated herein by reference.

FIELD OF THE INVENTION

The present invention relates to particulate, expandable vinyl aromatic polymers containing polymodal comminuted platelet athermanous particles, in particular graphite, their production and foams produced therefrom.

STATE OF THE ART

Expanded vinyl aromatic foams, in particular polystyrene foams have been known for a long time and have numerous applications in many fields. Such foams are produced by heating polystyrene particles impregnated with blowing agents to achieve an expansion in a mold where the expanded particles are welded together to achieve molded parts. A significant application area of such molded panels is thermal insulation in building and construction. Without any athermanous additives panels of expanded polystyrene foams have a minimum thermal conductivity at densities around 30 kg/m$^3$. To save material, it is nevertheless desirable to use foam boards having lower densities, in particular 15 kg/m$^3$ or even less for thermal insulation. The production of such foams is not a problem in technical terms. However, without athermanous particles, such foam boards have a drastically worse thermal insulation performance, so that they do not meet the requirements for thermal conductivity. The thermal conductivity usually exceeds 36 mW/m.K; typically a thermal conductivity of 36 and 38 mW/m.K can be achieved for a foam density around 14 and 18 g/l respectively.

It is known that the thermal conductivity of foams can be reduced by incorporation of athermanous materials such as carbon black, coke, graphite, metal oxides, metal powder or pigments.

European patent EP 0 620 246 relates to mouldings, used for insulation purposes, which are produced from rigid polystyrene foam or polystyrene particle foam, having a density of less than 20 kg/m$^3$ and a favourable thermal conductivity. The favourable thermal conductivity is achieved by providing the rigid polystyrene foam with an athermanous material selected from metal oxide, metal powder, aluminum pulver, carbon—such as soot or graphite—or organic dye or a mixture thereof.

European patent EP 0 863 175 relates to foam boards with a density of 20 to 200 kg/m$^3$ and cross-section of at least 50 cm$^2$, based on styrene copolymers containing 0.1 to 10% by weight of carbon particles characterised in that the carbon particles comprise graphite with a particle size of 1 to 100 µm and the foam has a flameproof finish to fire test B2 (to DIN 4102).

DE 19910257 patent application discloses fire-resistant polystyrene-based foam comprising a mixture of (A) 90 to 10% by weight of styrene polymer, (B) 10-90% by weight of phenolic resin, and (C) 5-50% by weight of expandable hexagonal graphite (based on mixture A+B) as well as a process for the production of polystyrene particle moldings.

European patent EP 1 137 701 relates to expandable polystyrene beads which comprise graphite particles with an average particle size of more than 50 µm, and also to a process for their preparation by free-radical polymerization of styrene in aqueous suspension. The graphite particles, suspended in styrene, are added to the polymerization mixture at a conversion of from 10 to 100%.

European patent EP 1 102 807 discloses a process for the preparation of expandable styrene polymers containing particles of graphite by polymerization of styrene in aqueous suspension in the presence of particles of graphite having a mass density of less than 1.8 g/cm$^3$.

European patent EP 0 981 575 discloses a process for preparing expandable styrene polymers containing graphite particles. Styrene is polymerized in aqueous suspension in the presence of graphite particles.

European patent application EP 2 358 798 discloses expandable vinyl aromatic polymers comprising: a matrix obtained by polymerizing 50 to 100% by weight of one or more vinyl aromatic monomers and 0 to 50% by weight of at least one co-polymerizable monomer; 1 to 10% by weight, calculated with respect to polymer, of an expanding agent embedded in the polymeric matrix; 0 to 25% by weight, calculated with respect to polymer, of a filler comprising carbon coke having an average diameter of between 0.5 and 100 µm, with a surface area, measured according to ASTM D-3037/89, ranging from 5 to 200 m$^2$/g; 0.05 to 10% by weight, calculated with respect to polymer, of expanded graphite in particle form, with a particle average diameter ranging from 1 to 30 µm, a surface area, measured according to ASTM D-3037/89, ranging from 5 to 500 m$^2$/g and a density ranging from 1.5 to 5 g/cm$^3$. The process for the production of the expandable vinyl aromatic polymer beads comprises polymerization in aqueous solution.

European patent EP 0 981 575 discloses a method for producing expandable styrene polymers containing from 0.05 to 25% by weight of graphite particles, by polymerising styrene in an aqueous suspension in the presence of graphite particles. The beads thus obtained have a diameter comprised between 0.2 and 2 mm. The expandable styrene polymer beads are used fort he production of styrene polymer foams with a density comprised between 5 and 35 kg/m$^3$.

European patent EP 1 102 807 discloses a method for the production of expandable styrene polymers containing graphite particles by polymerizing styrene in an aqueous suspension in the presence of 0.05 to 25% by weight of defoliated graphite particles with a density of less than 1.5 g/cm$^3$.

European patent application EP 1 877 473 discloses a process for improving the insulating capacity of expanded vinyl aromatic which comprises: 1) preparing beads of expandable vinyl aromatic polymers containing 1 to 10% by weight, calculated with respect to the polymer, of an expanding agent enclosed in the polymeric matrix and 0.01 to 25% by weight, calculated with respect to the polymer, of an athermanous additive comprising carbon black homogeneously distributed in the polymeric matrix; 2) treating the surface of the beads, before deposition of the coating, with a liquid lubricating agent; and 3) thermally treating the beads with hot air at a temperature ranging from 30 to 60° C. The expandable vinyl aromatic polymers further may comprise from 0 to 10% by weight, calculated with respect to the polymer, of graphite, from 0 to 10% by weight, calculated with respect to the polymer, of aluminum and from 0 to 10% by weight, calculated with respect to the polymer, of an inorganic derivative of silicon or magnesium. The expandable beads may be produced via polymerization in aqueous suspension in the presence of the athermanous additive or via polymerization in mass whereupon the vinyl aromatic polymer, together with the athermanous additive and other components, generally used for the production of expandable polymer foams, are fed to an extruder.

European patent application EP 2 513 209 relates to flame-protected polymer foams comprising at least one halogenated polymer, for example bromated polystyrol or styrol-butadiene-block copolymer, as a flame protection agent, having a bromine content in the range of 40 to 80% by weight, or tetrabromobisphenol-A compounds and between 0.05 and 5% by weight of graphite with an average particle size of from 1 to 50 μm. In one embodiment, the athermanous particles and a nonionic surfactant are mixed with a melt of the styrene polymer, preferably in an extruder. Alternatively the expandable styrene polymers may be produced via polymerization of styrene and optionally of copolymerizable monomers in aqueous suspension, and impregnation with a blowing agent, where the polymerization process is carried out in the presence of from 0.1 to 5% by weight of graphite particles, based on the styrene polymer, and of a nonionic surfactant.

European patent application EP 2 427 514 discloses thermo-insulating expanded articles with improved resistance to solar irradiation, which comprise an expanded polymeric matrix, obtained by expansion and sintering of beads of a vinyl aromatic polymer, in whose interior a filler is homogeneously dispersed, which comprises from 0.1 to 10% by weight of at least one athermanous material selected from coke, graphite and carbon black and optionally from 0 to 10% by weight of an inorganic additive active within the wave-lengths ranging from 100 to 20,000 cm$^{-1}$. The polymeric matrix comprises a copolymer of styrene and at least one vinyl aromatic comonomer substituted in the ring or on the vinyl group and/or a mixture of polystyrene and up to 10% by weight, with respect to the mixture, of a thermoplastic polymer compatible with polystyrene and having a glass transition temperature above 100° C. The process for the production of the expandable vinyl aromatic polymer beads comprises polymerization in aqueous solution or mixing, by means of static or dynamic mixing elements, the vinyl aromatic polymer beads or the polymer already in the molten stage, the expanding agent and all further additives.

International patent application WO 2011/133034 relates to a particulate, expandable polymer which can be processed into a foam having a fine cell structure and a low density and which, in order to improve the thermal insulation value thereof, contains a carbon-based thermal insulation value-increasing material being exfoliated graphite with a particle size in the range of 0.1 to 0.8 μm and an aspect ratio of 10 or more. The expandable polymer beads are prepared by extrusion or through polymerization of the monomers in the presence of blowing agent and carbon based particle.

International patent application WO 2011/042800 discloses nanocomposite compositions based on expandable thermoplastic polymers which comprise: a) a polymeric matrix produced by the polymerization of one or more vinyl and vinyl aromatic monomers; b) 1 to 10% by weight, calculated with respect to the polymer of a blowing agent enclosed in the polymeric matrix; c) 0.004 to 15% by weight, calculated with respect to the polymer of an athermanous filler comprising nano-scaled graphene plates with a thickness (orthogonal to the graphene sheet) not greater than 150 nm, an average dimension (length, width, or diameter) not greater than 10 μm and a surface area greater than 50 m$^2$/g. The expandable polymer beads are prepared by extrusion or through polymerization of the monomers in the presence of blowing agent and carbon based particle International patent application WO 2011/133035 relates to an insulating foamed molded part based on particulate expandable polystyrene. Said molded part comprises recycled polystyrene particles in addition to the particulate expandable polystyrene. The molded part comprises one or more additives selected from the group of active carbon, exfoliated graphite and pulverized carbon. When exfoliated graphite is used, the particle size is in the range of 0.1 to 0.8 μm.

European patent application EP 1 945 700 relates to expandable granulates having a composition based on vinylaromatic polymers, essentially consisting of 65 to 99.8% by weight of a copolymer obtained by polymerizing 85 to 100% by weight of one or more vinyl-aromatic monomers and 0 to 15% by weight of an alpha-alkylstyrene; 0.01 to 20% by weight, calculated with respect to the polymer, of carbon black; 0.01 to 5% by weight of graphite having an average diameter ranging from 0.5 to 50 μm and/or 0.01 to 5% by weight of oxides and/or sulfates and/or lamellar dichalcogenides of metals of groups IIA, IIIA, HB, IVB or VIIIB and/or 0.01 to 5% by weight of inorganic derivatives of silicon of the lamellar type; from 0.01 to 4.5% by weight, calculated with respect to the polymer, of a nucleating agent and from 1 to 6% by weight, calculated with respect to the total, of an expanding agent. The process for the preparation of the vinyl aromatic polymer beads consists in mixing the vinyl aromatic polymer, in the form of beads or in the molten stage, with the above additives.

European patent EP 0 915 127 discloses expandable polystyrene containing between 0.05- and 5% by weight athermanous particles, more particularly graphite with a particle size between 2.5 and 12 μm, in a homogeneous distribution whereby the expandable polystyrene particles are coated with 0.001 to 0.5% by weight of a hydrophobic agent. The expandable polystyrene is produced by mixing athermanous particles, blowing agent and molten polystyrene in an extruder followed by extruding, cooling and granulating. The polystyrene foam, prepared from the expandable polystyrene by foaming, has a density smaller than or equal to 35 kg/m$^3$.

International patent application WO 98/51735 discloses particulate expandable styrene polymers containing from 0.05 to 25% by weight of homogeneously distributed graphite particles having a particle size comprised between 2.5 and 10 μm; said expandable styrene polymers can be processed to give self-extinguishing foams having a density of smaller than or equal to 35 kg/m$^3$. The process for producing the particular expandable styrene polymer comprises mixing graphite particles and blowing agent with molten polystyrene in an extruder and then extruding the melt and cooling and granulating it.

JP 2005 002268 patent provides a styrene resin foam having low thermal conductivity and excellent thermal insulating properties, and a method for manufacturing the foam. The styrene resin foam comprises a graphite powder, and has a density of 10 to 100 kg/m$^3$, a closed cell ratio of not less than 60%, and an average cell diameter of 20 to 1000 μm. The aspect ratio of the graphite powder is not less than 5. In the manufacturing method of the styrene resin foam, a styrene resin, the graphite powder and a dispersant are blended by means of an extruder, the mixture is then extruded, cooled, and pelletized. The graphite powder-containing styrene resin particles thus obtained are suspended in water into which a foaming agent is supplied, so as to obtain foamable styrene resin particles impregnated with the foaming agent. The particles are then subjected to foaming with heating followed by molding.

Up until now, most athermanous materials introduced in expandable styrene polymers in order to reduce the thermal conductivity of the expanded styrene polymers suffer from one or more limitations and/or drawbacks. The interaction between athermanous additives and foams is complex. Without being limitative, one can mention the interaction of the athermanous material with the flame retardant and/or its synergist as a major issue since higher amounts of flame retardant have some times to be introduced in the expandable styrene polymer in order to be endowed with fire resistance properties that enable to have a good rating (B1 or B2) according to the DIN 4102-1 test. All athermanous additives have a certain influence on the cell formation and thus on expansion capabilities, density and open cell rate which again influences fire resistance and thermal conductivity.

Without contesting the associated advantages of the state of the art systems, it is nevertheless obvious that there is still a need for expandable vinyl aromatic polymers, in particular styrene polymers that do not show any of the existing shortcomings.

Aims of the Invention

The present invention aims to provide expandable vinyl aromatic polymers that do not present the drawbacks of the state of the art, in other words to provide expandable vinyl aromatic polymers enabling the production of expanded beads allowing molded parts such as insulation panels with an improved fire resistance and a reduced thermal conductivity obtained in an economically attractive and a safe way.

FIGURES

FIG. 1 represents a flow-sheet for the production of expandable vinyl aromatic polymer wherein:

(A) is the polymerization reactor producing the main polymer stream;

(B) is the unit for the addition of blowing agent, preferably n-pentane and/or isopentane, to the main polymer stream;

(C) is the branching point where the polymer side stream (2) is derived from the main polymer stream (1);

(D) is the mixing unit, preferably an extruder, where comminuted graphite particles and foam cell regulator, preferably talc and wax are dispersed in the derived polymer stream (2);

(E) is the merging point where both polymer streams join through a static mixer;

(F) is the extruder where flame retardant agent and synergist are blended with vinyl aromatic polymer before being fed into the main polymer stream through (G) to form the expandable vinyl aromatic polymer melt;

(H) is the under-water pelletizing unit;

(I) is the drying unit;

(J) is the packaging unit.

DEFINITIONS

Polymodal particle size distribution should be understood as a particle size distribution which has more than one mode, i.e. more than one distinct peak (for instance two, three or four peaks) in the graph representing the particle size versus the relative abundance at each size.

Trimodal particle size distribution should be understood as a particle size distribution which has three modes, i.e. three distinct peaks in the graph representing the particle size versus the relative abundance at each size.

Bimodal particle size distribution should be understood as a particle size distribution which has two modes, i.e. two distinct peaks in the graph representing the particle size versus the relative abundance at each size.

Aspect ratio should be understood as the ratio of the average diameter to the average thickness of the particles.

Particle diameter should be understood as the apparent volume diameter as obtained from the laser light scattering granulometry technique (HORIBA 920).

Carbon-based athermanous particles are for example graphite, graphene, carbon black, coke, carbon nanotubes, in various allotropic forms, wherein only graphite, graphene and coke are platelet.

Graphite should be understood as defined by "E. Fitzer, K.-H. Köchling, H. P. Boehm and H. Marsh in *International Union of Pure and Applied Chemistry—Recommended Terminology for the Description of Carbon as a Solid—Pure & Applied Chemistry*, Vol. 67, No. 3, pp. 491" as an allotropic form of the element carbon consisting of layers of hexagonally arranged carbon atoms in a planar condensed ring system (grapheme layers). The layers are stacked parallel to each other in a three-dimensional crystalline long-range order. There are two allotropic forms with different stacking arrangements, hexagonal and rhombohedral. The chemical bonds within the layers are covalent with $sp^2$ hybridization and with a C—C distance of 141.7 pm. The weak bonds between the layers are metallic with a strength comparable to Van Der Waals bonding only.

SUMMARY OF THE INVENTION

The present invention discloses expandable vinyl aromatic polymers comprising platelet graphite particles having a polymodal particle size distribution wherein (about) 45% or more of the total amount of particles has a diameter comprised between (about) 3 μm and (about) 20 μm and wherein (about) 40% or less of the total amount of particles has a diameter of less than (about) 3 μm.

Preferred embodiments of the present invention disclose one or more of the following features:
- (about) 60% or more of the total amount of graphite particles has a diameter comprised between (about) 3 µm and (about) 20 µm and wherein (about) 35% or less of the total amount of graphite particles has a diameter of less than (about) 3 µm;
- the polymodal particle size distribution of the platelet graphite particles is a bimodal or a trimodal distribution;
- the platelet graphite particles in the bimodal or trimodal particle size distribution are characterized by a BET of (about) 20 m$^2$/g or less, preferably of (about) 10 m$^2$/g or less and more preferably of (about) 5 m$^2$/g or less according to ASTM D-3037-9;
- the platelet graphite has an aspect ratio comprised between (about) 1 and (about) 200, preferably between (about) 5 and (about) 100 more preferably between (about) 5 and (about) 50;
- the expandable vinyl aromatic polymers comprise between (about) 1 and (about) 10% by weight, preferably between (about) 2 and (about) 6% by weight of graphite having a polymodal particle size distribution;
- the expandable vinyl aromatic polymers comprise between (about) 0.2 and (about) 25% by weight of flame retardant agent, between (about) 2 and (about) 10% by weight of blowing agent and between (about) 0.01 and (about) 5% by weight of foam cell regulator;
- the expandable vinyl aromatic polymers according to any of the preceding claims comprising between (about) 0.2 and (about) 25% by weight, preferably between (about) 1 and (about) 15% by weight of flame retardant agent, between (about) 2 and (about) 10% by weight, preferably between (about) 3 and (about) 7% by weight of blowing agent, between (about) 0.1 and (about) 5.0% by weight, preferably between (about) 0.1 and (about) 0.5% by weight of polyethylene wax and between (about) 0.25 and (about) 3.0% by weight, preferably between (about) 0.5 and (about) 2.0% by weight of talc;
- the beads or granules of the expandable vinyl aromatic polymer are prepared according to the process comprising the steps of:
  a) producing a main polymer melt stream after the polymerization process of the vinyl aromatic polymer;
  b) introducing a blowing agent into said main polymer melt stream;
  c) deriving a part of said main polymer stream and creating a side loop with an additional polymer melt stream;
  d) dispersing the platelet graphite particles and foam cell regulator into said additional polymer melt stream;
  e) joining the additional polymer stream and the main stream to form a new main polymer melt stream;
  f) introducing the flame retardant agent and the synergist into the new main polymer melt stream;
  g) cooling the polymer melt comprising all ingredients down to a temperature lower than (about) 180° C.;
  h) discharging through a die plate with holes and pelletizing the melt under water;
- between (about) 10 and (about) 30% of the main polymer stream is derived in step c) to form the additional polymer stream;
- the platelet graphite particles and foam cell regulator, preferably talc and wax, are dispersed in the additional polymer stream in step d) by means of an extruder;
- the flame retardant agent and synergist are blended, in a separate extruder, with vinyl aromatic polymer before being introduced in the new main polymer melt stream, in step f) comprising platelet graphite particles and foam cell regulator, preferably talc and wax;
- the present invention further discloses polymer foams obtained from the expandable vinyl aromatic polymers of the present invention.

DETAILED DESCRIPTION OF THE INVENTION

It is an object of the present invention to provide expandable vinyl aromatic polymers, in particular styrene polymers containing graphite particles which can be processed to expanded foams which have both a low density and a low thermal conductivity and have good processing properties, good physical properties and, in particular, very good flame retardant properties.

We have found that this object is achieved by particulate, expandable vinyl aromatic polymers, in particular styrene polymers, containing homogeneously distributed graphite particles, ground in such a way that the resulting particles are characterized by a polymodal particle size distribution with a diameter comprised between (about) 0.1 and (about) 50 µm, preferably between (about) 0.1 and (about) 35 µm. The expandable vinyl aromatic polymers, in particular styrene polymers, thus obtained, can be processed to foams with a density of less than (about) 20 kg/m$^3$, preferably less than (about) 16 kg/m$^3$ characterized by a thermal conductivity less than (about) 36 mW/m.K and preferably less than (about) 34 mW/m.K (in accordance to DIN 52612) and self-extinguishing properties to pass the burning test B2 (in accordance with DIN 4102).

Expandable vinyl aromatic polymers, in particular styrene polymers are vinyl aromatic polymers comprising blowing agent, preferably n-pentane and/or isopentane. The size of the expandable polymer beads is preferably in the range from (about) 0.2 to (about) 2 mm, preferably from (about) 1.0 to (about) 1.5 mm. Molded polymer foams can be obtained via prefoaming and sintering of the appropriate expandable vinyl aromatic polymer beads, in particular of the styrene polymer beads.

The vinyl aromatic polymers preferably used in the present invention comprise glass-clear polystyrene (GPPS), impact-resistant polystyrene (HIPS), anionically polymerized polystyrene or impact-resistant polystyrene (AIPS), styrene-.alpha.-methylstyrene copolymers, acrylonitrile-butadiene-styrene polymers (ABS), styrene-acrylonitrile polymer (SAN), acrylonitrile-styrene-acrylate (ASA), styrene acrylates, such as styrene-methyl acrylate (SMA) and styrene-methyl methacrylate (SMMA), methyl methacrylate-butadiene-styrene (MBS), methyl methacrylate-acrylonitrile-butadiene-styrene (MABS) polymers, styrene-N-phenylmaleimide copolymers (SPMI) or a mixture thereof, or a mixture of the above-mentioned styrene polymers with polyolefins, such as polyethylene or polypropylene, and polyphenylene ether (PPE).

The weight average molecular weight of the expandable vinyl aromatic polymers, in particular styrene polymers, of the present invention is preferably in the range from (about) 120 kDa to (about) 400 kDa, particularly preferably in the range from (about) 160 kDa to (about) 300 kDa, measured by means of gel permeation chromatography against polystyrene standards. The molar mass of the expandable vinyl aromatic polymers, in particular styrene polymers, in the extrusion processes is generally below the molar mass of the vinyl aromatic polymers, in particular of the polystyrene, used, by (about) 10 kDa, because of the degradation of molar mass caused by shear and/or by heat.

The above-mentioned vinyl aromatic polymers, in particular styrene polymers, can be blended with thermoplastic polymers, such as polyamides (PA), polyolefins, e.g. polypropylene (PP) or polyethylene (PE), polyacrylates, e.g. polymethyl methacrylate (PMMA), polycarbonate (PC), polyesters, e.g. polyethylene terephthalate (PET) or polybutylene terephthalate (PBT), polyether sulfones (PES), polyether ketones, or polyether sulfides (PES), or a mixture thereof, generally in total proportions of up to at most 30% by weight, preferably in the range from 1 to 10% by weight, based on the polymer melt, in order to improve mechanical properties or heat resistance, optionally with use of compatibilizers. Mixtures within the abovementioned ranges of amounts are also possible with, for example, hydrophobically modified or functionalized polymers or oligomers, rubbers, e.g. polyacrylates or polydienes, for example styrene-butadiene block copolymers, or biodegradable aliphatic or aliphatic/aromatic copolyesters.

The graphite used with the expandable vinyl aromatic polymers, in particular with the styrene polymers of the present invention is obtained from grinding graphite in a delamination mill such as for example an air jet mill and preferably a spiral flow mill.

Grinding is performed in such a way that a particle size distribution, as determined by the laser light scattering granulometry technique, with a diameter comprised between (about) 0.1 and (about) 50 µm, preferably between (about) 0.1 and (about) 35 µm is obtained.

The technique of laser diffraction is based on the principle that particles passing through a laser beam will scatter light at an angle that is directly related to their size: large particles scatter at low angles, whereas small particles scatter at high angles. The laser diffraction is accurately described by the Fraunhofer approximation and the Mie theory, with the assumption of spherical particle morphology.

Concentrated suspensions, comprising about 1.0% by weight of carbon based particles, are prepared, using suitable wetting and/or dispersing agents.

Suitable solvents are for example water or organic solvents such as for example ethanol, isopropanol, octane or methyl ethyl ketone. A sample presentation system ensures that the material under test passes through the laser beam as a homogeneous stream of particles in a known, reproducible state of dispersion.

The particle size distribution has been measured by laser light scattering using the particle size analyzer (HORIBA 920) from (Horiba Scientific). The samples were suspended in methyl ethyl ketone at a concentration of about 1% weight, without the use of ultrasonication.

Figure 2:
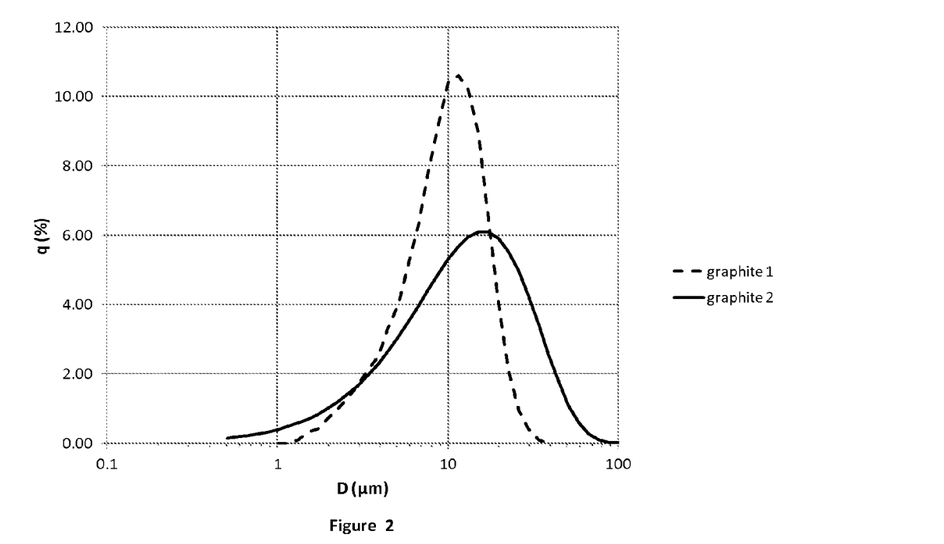
FIG. 2 represents the particle size distribution of two types of graphite after grinding and before mixing into the polymer matrix, wherein graphite 1 is Timrex KS 15 (Imerys) with a median diameter of 6.1 μm (dashed line) and graphite 2 is Timrex KS 44 (Imerys) with a median diameter of 12.4 μm (continuous line).

The comminuted graphite, obtained after grinding, preferably used in the present invention, is characterized in that (about) 50% or more, preferably (about) 65% or more of the total amount of the particles prove a diameter comprised between (about) 3 µm and (about) 20 µm while (about) 40% or less, preferably (about) 35% or less, of the total amount of the particles has a diameter of less than (about) 3 µm (FIG. 2).

The graphite used in the invention exhibit a high aspect ratio. The comminuted graphite used within the scope of the present invention is characterized by an aspect ratio between (about) 1 and (about) 200, preferably between (about) 5 and (about) 100 more preferably between (about) 5 and (about) 50.

The comminuted graphite of the invention is further characterized by a BET specific surface (according to the Brunauer-Emmett-Teller Surface Area Analysis) (according to ASTM D3037-93) of (about) 20 $m^2/g$ or less, preferably of (about) 15 $m^2/g$ or less and more preferably of (about) 10 $m^2/g$ or less, most preferably (about) 5 $m^2/g$ or less.

It has been demonstrated that extrusion conditions of the vinyl aromatic polymer, in particular the styrene polymer, comprising the comminuted graphite and optionally other components used for the production of expandable vinyl aromatic polymers are the key for the thermal conductivity reduction capabilities of the incorporated comminuted graphite particles.

It thus has been observed that particular soft extrusion conditions (dispersion into the polymer matrix, by addition into the molten polymer stream) to a large extent improves the delamination of the comminuted graphite, while further fragmentation is hardly observed. On the other hand, deviation from these specific extrusion conditions (extrusion of the polymer—graphite mix wherein the polymer is in a non-molten state) causes mostly fragmentation of the comminuted graphite particles meanwhile delamination is observed to a lesser extent.

Using OCS (Optical Control System) it has been demonstrated that there is less gel-formation in the vinyl aromatic polymer, when prepared according to proper extrusion conditions. These gels, in general having a diameter of (about) 100 µm or more, result from the agglomeration of the small graphite particles. Contrary to the small graphite particles, these agglomerates do not reflect infrared irradiation, thus negatively influencing the insulation properties of the derived foam panels.

Further it has been observed that the presence of gels has a negative influence on the proportion of closed cells in the foam, once more negatively influencing the insulation properties of the foam.

It has been demonstrated that improper extrusion conditions result in a gel-formation that is about ten times that of using proper dispersion conditions easily reached by dispersing the athermanous particles directly into the molten polymer matrix.

Thus, within the scope of the present invention, it has been observed that the dispersion of the comminuted graphite particles directly into the molten polymer matrix generates so called proper dispersion conditions (for example extrusion conditions) of the vinyl aromatic polymer comprising the comminuted graphite and optionally other components used for the production of expandable vinyl aromatic polymers. Such proper dispersion conditions result in graphite with a polymodal particle size distribution characterized in that (about) 45% or more, preferably (about) 60% or more of the total amount of particles have a diameter comprised between (about) 3 µm and (about) 20 µm, whereas (about) 40% or less, preferably (about) 35% or less of the total amount of particles have a diameter of less than (about) 3 µm.

The particle size distribution has been measured by laser light scattering using the particle size analyzer (HORIBA 920) from (Horiba Scientific).

The measurement method is analogous to the protocol used for the determination of the apparent diameter of styrene-butadiene-styrene particles in High Impact Polystyrene (HIPS).

Concentrated suspensions of carbon-based particles, are prepared in methyl ethyl ketone at a concentration of about 1% weight, without the use of ultrasonication. The expandable vinyl aromatic polymer particles are dissolved in the solvent while the carbon-based particles are dispersed; the dissolution time is about 30 minutes.

Foams with a density of less than (about) 20 kg/m$^3$ and sometimes less than (about) 16 kg/m$^3$ obtained from the expansion and molding of expandable polystyrene (EPS) obtained from the above proper extrusion conditions are characterized by a thermal conductivity of (about) 34 mW/m.K or less.

On the contrary improper dispersion conditions, for example where solid polymer and comminuted graphite particles are mixed and molten in the same step in an extruder, result in a too high degree of fragmentation of the comminuted graphite causing an increase of the volume percentage of particles with a diameter of less than (about) 3 μm, while the volume percentage of particles with a diameter between (about) 3 μm and (about) 20 μm decreases.

Foams with a density of less than (about) 20 kg/m$^3$ and obtained from expanded EPS particles obtained according to the above improper dispersion conditions of the comminuted graphite particles are characterized by a thermal conductivity of more than (about) 36 mW/m.K.

In the manufacturing process of the present invention, the vinyl aromatic polymer, in particular the styrene polymer, leaves the polymerization reactor in a molten state. The obtained melt stream is then divided in a main polymer melt stream and the additional polymer melt stream (side stream).

The additional polymer melt stream is deviated to a dynamic or a static mixing equipment, preferably an extruder, where the comminuted graphite and foam cell regulator are fed to and dispersed in the polymer melt, whereupon the additional polymer melt stream recombines with the main polymer melt stream to result in a polymer melt comprising, with respect to the overall weight of the resulting polymer melt, between (about) 1 and (about) 10% by weight, preferably between (about) 2 and (about) 6% by weight of comminuted graphite particles in the bimodal or trimodal particle size distribution and between (about) 0.01 and (about) 5% by weight and preferable between (about) 0.15 and (about) 3.5% by weight of foam cell regulator.

Various kinds of cell regulators working according to various mechanism are known in the field of polymer foams. Inert particles at polymer melt temperatures such as talc; titanium dioxide; clays such as kaolin; silicagel; calcium polysilicate; gypsum; metal particles; calcium carbonate; calcium sulfate; magnesium carbonate; magnesium hydroxide; magnesium sulfate; barium sulfate; diatomaceous earth; nano-particles such as nano-particles of calcium carbonate, nano clay and nano-graphitework work by adsorbing microscopic (mainly liquid) blowing agent particles and improving the dispersion of those particles in the polymer matrix.

Other cell regulators, called chemical cell regulators, such as citric acid, sodium bicarbonate or other salts with decomposition temperatures in the range of the polymer melt temperatures work as bubble initiators in the polymer matrix trough the decomposition of the salt releasing $CO_2$.

Finally various molecules, the so called nucleating agents, are also known as cell regulators as they influence the cristallinity of a polymer and thereby the solubility of the blowing agent (n-pentane/iso-pentane) in the polymer matrix. Typical products considered as nucleating agents, in particular for semi crystalline or crystalline polymers are esters of abietic acids, polyoxyethylene sorbitan monolaurate, Montan wax, Candelilla wax, Carnauba wax, Paraffine wax, Ceresine wax, Japan wax, Petrolite wax, Ceramer wax, polyethylene wax, polypropylene wax and mixtures thereof.

A foam cell regulator of particular interest within the scope of the present invention comprises a mixture of talc and polyethylene wax.

Examples of polyethylene wax, particularly suitable for being used in the expandable vinyl aromatic compositions, are high density polyethylene waxes characterized by a weight average molecular weight in the range of from (about) 500 to (about) 5000 Da.

Examples of talc, particularly suitable for being used in the expandable vinyl aromatic compositions, are these characterized by a median particle size comprised between (about) 1 μm and (about) 20 μm, preferably between (about) 5 μm and (about) 15 μm.

The foam cell regulator mixture is added in such a way that the final expandable vinyl aromatic polymer comprises between (about) 0.10 and (about) 1.0% by weight, preferably between (about) 0.1 and (about) 0.50% by weight and more preferably between (about) 0.15 and (about) 0.35% by weight of polyethylene wax and between (about) 0.25 and (about) 3.0% by weight and preferably between (about) 0.5 and (about) 2.0% by weight of talc.

The use of a molten vinyl aromatic polymer stream as a matrix for the graphite particles allows a particular soft treatment of those particles during the dispersion process Alternatively, a masterbatch of vinyl aromatic polymer, in particular styrene polymer, comprising between (about) 20 and (about) 50% by weight of comminuted graphite particles in the bimodal or trimodal particle size distribution is prepared accordingly the above proper dispersion conditions.

The comminuted graphite particles, as starting material, can be in a polymodal or a monomodal state and can later be transformed in a polymodal state as a dispersion in the polymer matrix. Polymodality can be generated by mixing several monomodal particle size distributions, by a suitable comminution or by a specific dispersion of monomodal or polymodal particle size distributions in the polymer matrix.

Subsequently the masterbatch along with vinyl aromatic polymer, in particular styrene polymer, and the other optional components are fed to the extruder in such an amount that the resulting extrudate, comprises between (about) 1 and (about) 10% by weight, preferably between (about) 2 and (about) 6% by weight with respect to the overall weight of the resulting extrudate, of platelet graphite particles in the bimodal or trimodal particle size distribution.

The foams derived from the expanded vinyl aromatic polymers, in particular styrene polymers, comprising comminuted graphite particles in the bimodal or trimodal particle size distribution are used, not only because the thermal insulating effect is significantly improved, but also because they allow the addition of a reduced amount of fire retardant agent for the case that fire retardance with B2 rating, in accordance to DIN 4102-1, is required.

The components that are used as the flame retardant agents—usually halogenated products—are relatively expensive, so that the molded bodies according to the invention comprising comminuted graphite particles in the bimodal or trimodal particle size distribution are considerably less expensive and can also be produced so as to be more environmentally compatible.

The flame-retardant agents particularly suitable for being used in the expandable vinyl aromatic compositions are chlorinated and/or brominated polymers, aliphatic, cycloaliphatic and aromatic brominated compounds, such as hexabromocyclododecane, pentabromomonochlorocyclohexane, tetrabromobisphenol A bis(allyl ether) and pentabromophenyl allyl ether; among the above, hexabromocyclododecane, tetrabromobisphenol A bis(allyl ether) and brominated polymers are preferred.

The flame-retarded polymer foams obtained from the vinyl aromatic polymers of the present invention alternatively comprise, based on the polymer foam, an amount in the range from (about) 0.2 to (about) 10% by weight, preferably in the range from (about) 0.5 to (about) 6% by weight of aliphatic, cyclo-aliphatic and aromatic brominated compounds.

The flame-retardant polymer foams of the invention generally comprise, based on the polymer foam, an amount in the range from (about) 0.2 to (about) 25% by weight, preferably in the range from (about) 1 to (about) 15% by weight, of the halogenated polymers. Amounts of from (about) 5 to (about) 10% by weight, based on the polymer foam, ensure adequate flame retardancy, in particular for foams made of expandable polystyrene.

The weight average molecular weight, determined by means of gel permeation chromatography against polystyrene standards, of the halogenated, preferably brominated polymers, used as flame retardant, is preferably in the range from (about) 5 kDa to (about) 300 kDa, in particular from (about) 30 kDa to (about) 150 kDa.

The weight loss from the halogenated polymer in thermogravimetric analysis (TGA) is (about) 5% by weight at a temperature of (about) 250° C. or higher, preferably in the range from (about) 270 to (about) 370° C.

The bromine content of preferred halogenated polymers is in the range from (about) 20 to (about) 80% by weight, preferably from (about) 40 to (about) 80% by weight.

Halogenated polymers preferred as flame retardant are brominated polystyrene or styrene-butadiene block copolymer having bromine content in the range from (about) 40 to (about) 80% by weight.

Other halogenated polymers preferred as flame retardant are polymers having tetrabromobisphenol A units (TBBPA), for example tetrabromobisphenol A diglycidyl ether compounds.

The effectiveness of the halogenated fire retardant agent can be still further improved via addition of suitable flame retardant synergists, examples being the thermal free-radical generators dicumyl peroxide, di-tert-butyl peroxide and dicumyl. Another example of suitable flame retardant synergist is antimony trioxide. Flame retardant synergists are generally used in amounts of from (about) 0.05 to (about) 5% by weight, based on the polymer foam, in addition to the halogenated flame retardant agent.

Expandable vinyl aromatic polymers are vinyl aromatic polymers comprising blowing agent. The vinyl aromatic polymer melt comprising blowing agent generally comprises, based on the vinyl aromatic polymer melt comprising blowing agent, a total proportion of from (about) 2 to (about) 10% by weight, preferably from (about) 3 to (about) 7% by weight, of one or more blowing agents distributed homogeneously. Suitable blowing agents are the physical blowing agents usually used in expandable styrene polymers e.g. aliphatic hydrocarbons having from 2 to 7 carbon atoms, alcohols, ketones, ethers, or halogenated hydrocarbons. Preferred blowing agents are isobutane, n-butane, isopentane, or n-pentane.

The expandable vinyl aromatic polymers further can comprise the usual and known auxiliaries and additives, examples being, fillers, UV stabilizers, chain-transfer agents, plasticizers, antioxidants, soluble and insoluble inorganic and/or organic dyes and pigments.

It is advantageous that the molded foams can have a density of less than (about) 20 kg/m$^3$, preferably less than (about) 16 kg/m$^3$.

The molded foam can exhibit a coefficient of thermal conductivity of (about) 35 mW/m.K or less and preferably of (about) 33 mW/m.K or less.

In previous patent application WO 2012/17534, it has been demonstrated that the appropriate choice of foam cell regulator, more specifically the right combination of polyethylene wax and talc is relevant to reach the aimed thermal conductivity (about 32 mW/m.K) for a molded foam with the preconceived low density (less than about 20 kg/m$^3$).

Figure 1:
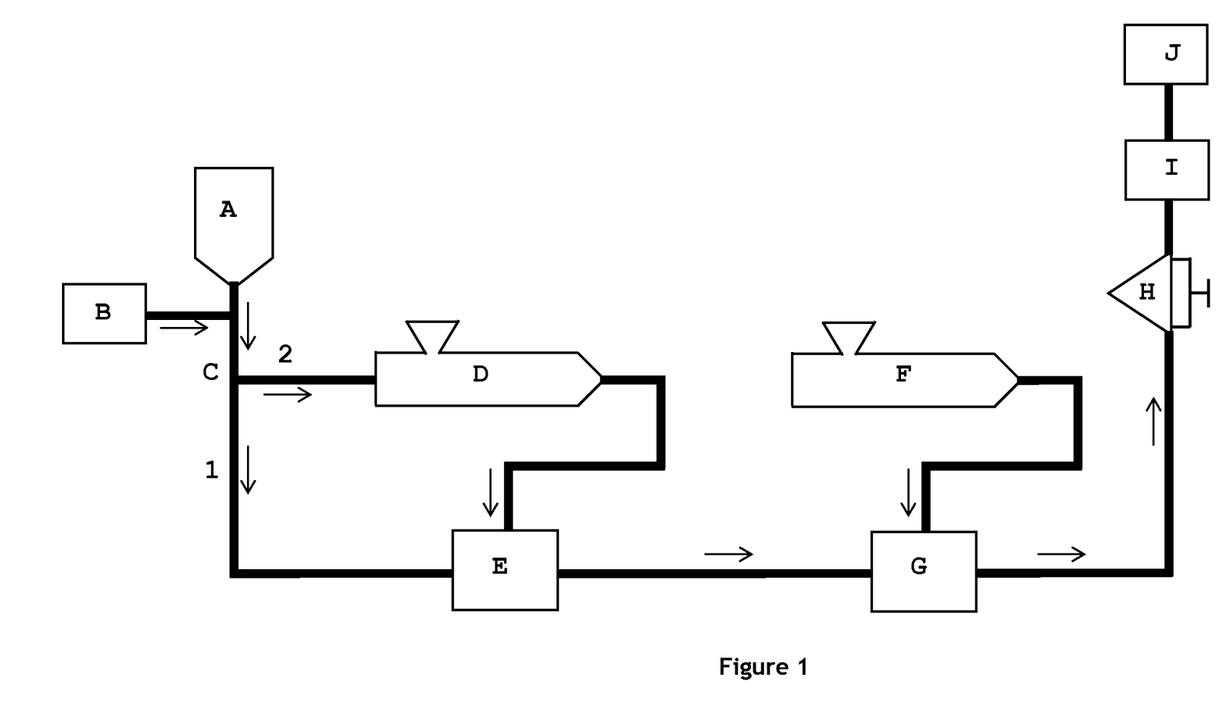

Various processes can be used to produce the particularly preferred expandable vinyl aromatic polymers, in particular the styrene polymers. After the polymerization process, the melt stream is divided into the main polymer stream (1) and an additional polymer side stream (2) (FIG. 1). The side stream constitutes a loop to take up the first additive package, for example graphite and foam cell regulator, preferably talc and wax.

In a preferred embodiment, comminuted graphite particles in the bimodal or trimodal particle size distribution, are taken as starting point together with a mixture of talc and wax. These three components are simultaneously fed into the additional polymer side stream of the vinyl aromatic polymer via a mixing unit, preferably via an extruder. After dispersion of the first additive package, said additional polymer stream joins again the main polymer stream, both in the molten stage, preferably through a static mixer.

In another embodiment comminuted graphite particles in the monomodal particle size distribution and the mixture of talc and wax are simultaneously fed into the additional polymer side stream of the vinyl aromatic polymer via a mixing unit, preferably via an extruder. After dispersion of the monomodal comminuted graphite, the particle size distribution becomes polymodal.

The vinyl aromatic polymer melt comprising blowing agent, comminuted graphite particles in the bimodal or trimodal particle size distribution, foam cell regulator, preferably talc and wax and in a later stage flame retardant agent and synergist, after homogenization, is rapidly cooled under pressure, in order to avoid foaming. It is therefore advantageous to carry out underwater pelletization in a closed system under pressure.

Particular preference is given to a process for producing flame-retarded, expandable vinyl aromatic polymers, in particular styrene polymers, comprising the steps of:
a) producing a main polymer melt stream after the polymerization process;
b) introducing a blowing agent into said main polymer melt stream;
c) deriving a part of said main polymer melt stream and creating a main polymer melt stream and an additional polymer melt stream;
d) using an extruder at a temperature of at least 180° C. for incorporating the comminuted graphite particles in the bimodal or trimodal particle size distribution and the mixture of talc and wax into the additional polymer melt stream;
e) merging the main and the additional polymer melt stream, containing the dispersed graphite, wax and talc and forming a new main polymer melt stream;
f) introducing the flame retardant agent and the synergist into the new main polymer melt stream;
g) cooling the vinyl aromatic polymer melt comprising all necessary ingredients to a temperature of from (about) 120° C. to (about) 200° C., h) discharging through a die plate with holes, the diameter of which at the exit from the die is comprised between (about) 1 and (about) 2 mm, preferably about 1.5 mm;

i) pelletizing the melt comprising blowing agent directly downstream of the die plate under water at a pressure in the range from (about) 2 to (about) 20 bar, preferably in the range from (about) 5 to (about) 10 bar.

The pellets (beads, granules) can then further be coated and processed to give expanded vinyl aromatic polymer foams, in particular polystyrene foams.

In a first step, the expandable vinyl aromatic polymer pellets of the invention can be prefoamed by using hot air or steam, in what are known as prefoamers, to give foam beads of density in the range from (about) 8 to (about) 200 kg/m³, in particular from (about) 10 to (about) 50 kg/m³ preferably from (about) 10 to (about) 20 kg/m³ In a second step the prefoamed beads are placed in molds, and retracted under pressure. After this retraction, they are treated with steam to partly melt the skin of the beads and once the pressure is released the prefoamed beads are fused in a closed mold to give molded foams.

Examples

The examples in Table 1 illustrate the invention; they are merely meant to exemplify the present invention but are not destined to limit or otherwise define the scope of the present invention.

In this table:

Column 1: indicates the identification number of the example.

Figure 3:
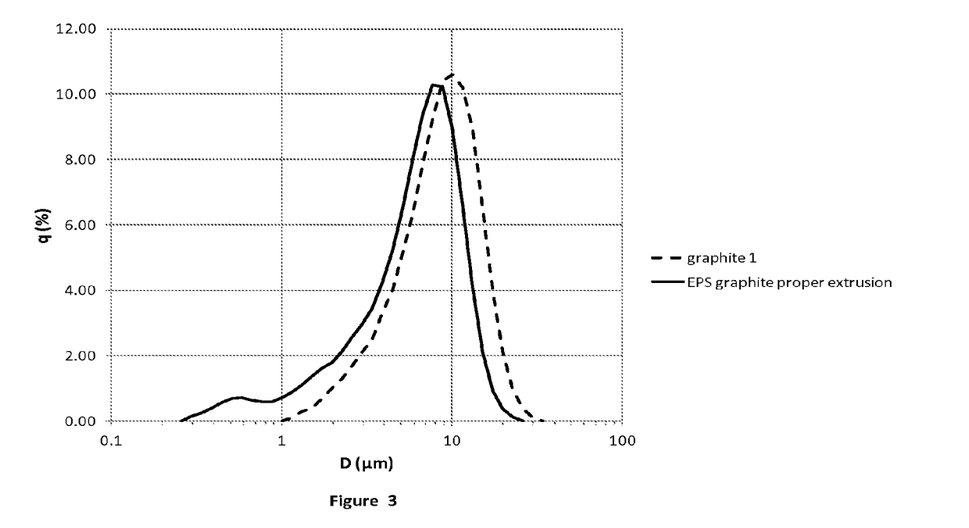
FIG. 3 represents the particle size distribution for graphite 1, as obtained from the laser light scattering granulometry technique (HORIBA 920), wherein q (%) represents the volume percentage of the apparent diameter and D(μm) represents the apparent diameter of the particle. In this figure the dashed line represents the particle size distribution for graphite 1, after grinding; the continuous line represents the particle size distribution for graphite 1 after dispersion into the polymer matrix by addition into the molten polymer stream and measured on the expandable beads.
Figure 4:
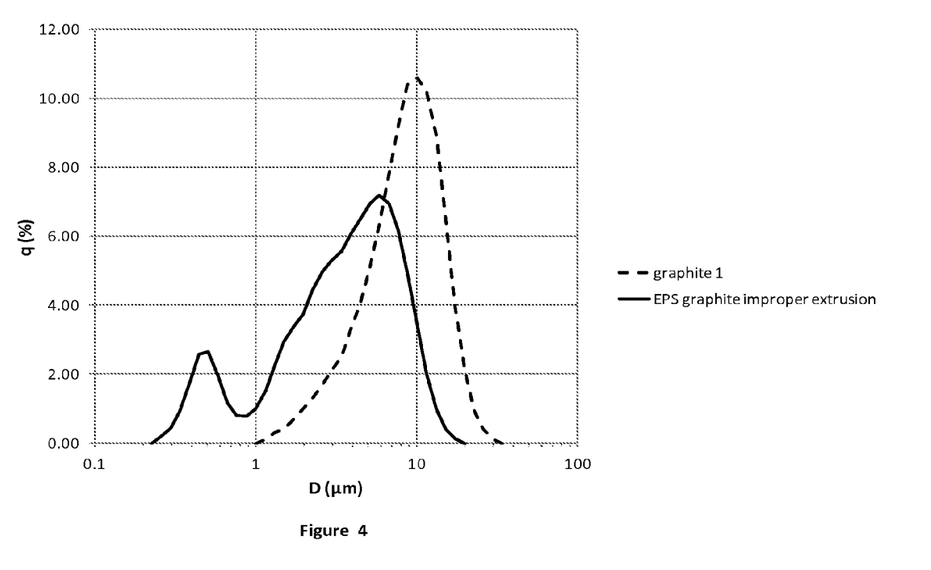
FIG. 4 represents the particle size distribution for graphite 1, as obtained from the laser light scattering granulometry technique (HORIBA 920), wherein q (%) represents the volume percentage of the apparent diameter and D(μm) represents the apparent diameter of the particle. In this figure the dashed line represents the particle size distribution for graphite 1, after grinding; the continuous line represents the particle size distribution for graphite 1 after improper extrusion, thus extrusion of the polymer—graphite mix wherein the polymer is in a non-molten state.

Column 2: indicates the type and percentage of athermanous particle added to the extrudate wherein:
  D is a dispersion of polymodal comminuted graphite, obtained from proper dispersion conditions of comminuted graphite, through extrusion in the additional polymer stream, obtained via derivation of a part of the main polymer melt stream (see FIG. 3);
  MB is a masterbatch of polystyrene comprising 30% by weight of polymodal comminuted graphite, obtained from improper extrusion conditions, creating fragmentation rather than delamination, of comminuted graphite (see FIG. 4).

Column 3: indicates the density of the foam (kg/m3).

Column 4: indicates the thermal conductivity λ (mW/m.K) determined at 10° C. mean temperature according to DIN 52612.

Column 5: indicates the percentage of the total amount of the particles having a diameter of less than 3 μm Column 6: indicates the percentage of the total amount of the particles having a diameter comprised between 3 μm and 20 μm.

For all the examples 1% of talc (Luzenac 20 MO) and 0.5% by weight of polywax 2000 (Baker Hughes) was added to the polymer melt via extrusion.

All the examples comprise 1.4% by weight, on final extrudate, of hexabromocyclododecane and 0.33% by weight, on final extrudate, of 2,3-dimethyl-2,3-diphenylbutane. The foam panels derived all have B2 rating (DIN 4102).

TABLE 1

| Ex. | Athermanous Particle (% w) | Foam Density | Thermal Conductivity | % particles (<3 μm) | % particles (3-20 μm) |
|---|---|---|---|---|---|
| 1 | D1 (3.5) | 11.8 | 31.8 | 20 | 80 |
| 2 | D2 (3.5) | 13.6 | 32.2 | 14 | 55 |
| 3 | MB1 (3.5) | 18.0 | 34.3 | 47 | 53 |
| 4 | MB1' (3.5) | 14.2 | 35.1 | 50 | 50 |
| 5 | None | 15.3 | 38.2 | none | none |

As can be seen in Table 1, the addition of 3.5% by weight of comminuted graphite (graphite 1 and graphite 2 respectively) via an extruder situated in the side polymer melt stream (Ex.1 and Ex.2) results in a polystyrene foam with decreased thermal conductivity.

In example 3, comminuted graphite 1 has been added at 3.5% by weight via a masterbatch (MB1) prepared according to improper extrusion conditions;

In example 4 comminuted graphite 1 has been added at 3.5% by weight via a masterbatch (MB1'), prepared according to extrusion conditions which are worse compared the extrusion conditions of MB1;

wherein:
  graphite 1 is Timres KS 15 with a median diameter $d_{50}$ of 6.1 μm and
  graphite 2 is Timrex KS 44 with a median diameter $d_{50}$ of 12.4 μm.

For the foam panels of example 1 and example 2, a thermal conductivity around 32 mW/m.K is measured. Graphite 1 performs better than graphite 2: a higher percentage of particles has a diameter comprised between 3 and 20 μm (80% for graphite 1 versus 55% for graphite 2). Besides graphite 2 is characterized by a higher value for the median diameter (12.4 μm for graphite 2 versus 6.1 μm for graphite 1)

As appears from examples 3 and 4, improper extrusion conditions result in an increased percentage of particles with a diameter less than 3 μm (47 and 50% respectively) and a decreased percentage of particles with a diameter between 3 and 20 μm (53 and 50 respectively).

These values should be compared with those for example 1 where the graphite 1 is dispersed into the vinyl aromatic polymer accordingly the method of the present invention (dispersion into the polymer matrix by addition into the molten polymer stream). For example 1 the percentage of particles with a diameter less than 3 μm (20%) is much smaller compared with the percentages for example 3 and 4 (47 and 50% respectively); on the contrary the percentage of particles with a diameter comprised between 3 and 20 μm (80%) is much higher than the percentages for example 3 and 4. (53 and 50 respectively).

The table clearly proves that improper extrusion conditions cause increased fragmentation and less delamination, as a consequence of which higher values for thermal conductivity of the derived foam panels are measured.

The invention claimed is:

1. Expandable vinyl aromatic polymers comprising platelet graphite particles having a polymodal particle size distribution, wherein 45% or more of a total amount of the platelet graphite particles have a diameter between 3 μm and 20 μm, and wherein 40% or less of the total amount of the platelet graphite particles have a diameter of less than 3 μm.

2. The expandable vinyl aromatic polymers according to claim 1, wherein 60% or more of the total amount of the platelet graphite particles have a diameter between 3 μm and 20 μm, and wherein 35% or less of the total amount of the platelet graphite particles have a diameter of less than 3 μm.

3. The expandable vinyl aromatic polymers according to claim 1, wherein said polymodal particle size distribution is a bimodal or a trimodal distribution.

4. The expandable vinyl aromatic polymers according to claim 1, wherein the platelet graphite particles are characterized by a BET of 20 $m^2/g$ or less according to ASTM D-3037-93.

5. The expandable vinyl aromatic polymers according to claim 1, wherein the platelet graphite particles have an aspect ratio between 1 and 200.

6. The expandable vinyl aromatic polymers according to claim 1, wherein the expandable vinyl aromatic polymers comprise between 1 and 10% by weight of the platelet graphite particles having the polymodal particle size distribution.

7. The expandable vinyl aromatic polymers according to claim 1, wherein the expandable vinyl aromatic polymers comprise between 0.2 and 25% by weight of flame retardant agent, between 2 and 10% by weight of blowing agent, and between 0.01 and 5% by weight of foam cell regulator.

8. The expandable vinyl aromatic polymers according to claim 1, wherein the expandable vinyl aromatic polymers comprise between 0.2 and 25% by weight of flame retardant agent, between 2 and 10% by weight of blowing agent, between 0.1 and 1.0% by weight of polyethylene wax, and between 0.25 and 3.0% by weight, of talc.

9. A process for the preparation of beads or granules of expandable vinyl aromatic polymer comprising platelet graphite particles having a polymodal particle size distribution, wherein 45% or more of a total amount of the platelet graphite particles have a diameter between 3 μm and 20 μm, and wherein 40% or less of the total amount of the platelet graphite particles have a diameter of less than 3 μm, the process comprising:
 a) producing a main polymer melt stream after a polymerization process of the vinyl aromatic polymer;
 b) introducing a blowing agent into said main polymer melt stream;
 c) deriving a part of said main polymer stream and creating a side loop with an additional polymer melt stream;
 d) dispersing the platelet graphite particles and foam cell regulator into said additional polymer melt stream;
 e) joining the additional polymer stream and the main polymer melt stream;
 f) introducing flame retardant agent and synergist into the main polymer melt stream;
 g) cooling the polymer melt down to a temperature lower than 200° C.; and
 h) discharging the polymer melt through a die plate with holes and pelletizing the polymer melt under water.

10. The process according to claim 9, wherein between 10 and 30% of the main polymer melt stream is derived in step c) to form the additional polymer melt stream.

11. The process according to claim 9, wherein, in step d), the platelet graphite particles and the foam cell regulator are dispersed in the additional polymer melt stream by means of an extruder.

12. The process according to claim 9, wherein, in step f), the flame retardant agent and the synergist are blended, in a separate extruder, with the vinyl aromatic polymer before being introduced in the main polymer melt stream, comprising the platelet graphite particles and the foam cell regulator.

13. Polymer foams obtained from the expandable vinyl aromatic polymers according to claim 1.

14. The expandable vinyl aromatic polymers according to claim 1, wherein the platelet graphite particles are characterized by a BET of 10 $m^2/g$ or less according to ASTM D-3037-93.

15. The expandable vinyl aromatic polymers according to claim 1, wherein the platelet graphite particles are characterized by a BET of 5 $m^2/g$ or less according to ASTM D-3037-93.

16. The expandable vinyl aromatic polymers according to claim 1, wherein the platelet graphite particles have an aspect ratio between 5 and 100.

17. The expandable vinyl aromatic polymers according to claim 1, wherein the platelet graphite particles have an aspect ratio between 5 and 50.

18. The expandable vinyl aromatic polymers according to claim 1, wherein the expandable vinyl aromatic polymers comprise between 2 and 6% by weight of the platelet graphite particles having the polymodal particle size distribution.

19. The expandable vinyl aromatic polymers according to claim 1, wherein the expandable vinyl aromatic polymers comprise between 1 and 15% by weight of flame retardant agent, between 3 and 7% by weight of blowing agent, between 0.1 and 0.5% by weight of polyethylene wax, and between 0.5 and 2.0% by weight of talc.

* * * * *